United States Patent
Kuroiwa et al.

[11] Patent Number: 5,960,063
[45] Date of Patent: Sep. 28, 1999

[54] TELEPHONE SPEECH RECOGNITION SYSTEM

[75] Inventors: Shingo Kuroiwa; Masaki Naito; Seiichi Yamamoto, all of Saitama; Shin-ichi Sakayori, Tokyo; Masanobu Fujioka, Saitama, all of Japan

[73] Assignee: Kokusai Denshin Denwa Kabushiki Kaisha, Tokyo, Japan

[21] Appl. No.: 08/892,606

[22] Filed: Jul. 14, 1997

[30] Foreign Application Priority Data

Aug. 23, 1996 [JP] Japan ................................. 8-239938

[51] Int. Cl.⁶ ......................................................... H04M 3/50
[52] U.S. Cl. ................................ 379/88.01; 379/88.19; 379/907; 704/246
[58] Field of Search .............................. 379/88.01, 88.02, 379/88.03, 88.04, 88.19, 88.2, 88.21, 1, 16, 24, 410, 338, 339

[56] References Cited

U.S. PATENT DOCUMENTS

| | | | |
|---|---|---|---|
| 4,847,885 | 7/1989 | Vittorelli | 379/6 |
| 5,274,695 | 12/1993 | Green | 1/64 |
| 5,369,685 | 11/1994 | Kero | 379/67 |
| 5,479,490 | 12/1995 | Nakashima | 1/64 |
| 5,666,400 | 9/1997 | McAllister et al. | 379/67 |
| 5,721,808 | 2/1998 | Minami et al. | 395/2.65 |
| 5,732,388 | 3/1998 | Hoege et al. | 704/205 |
| 5,751,898 | 5/1998 | Kosaka et al. | 395/2.5 |
| 5,758,021 | 5/1998 | Hackbarth | 395/2.41 |
| 5,764,759 | 6/1998 | Hamilton et al. | 379/410 |
| 5,806,029 | 9/1998 | Buhrke et al. | 704/244 |
| 5,812,972 | 9/1998 | Juang et al. | 704/234 |
| 5,819,223 | 10/1998 | Takagi | 704/256 |

*Primary Examiner*—Krista Zele
*Assistant Examiner*—Roland G. Foster
*Attorney, Agent, or Firm*—Westman, Champlin & Kelly, P.A.

[57] ABSTRACT

A telephone speech recognition system is provided which has a high level of speech recognition without affecting from various conditions of a telephone line. The system comprises speech analyzers (4) and (5), and reference speech model storages (7) to (9) corresponding to line connection data. A telephone line interface (1) having a line connection data acquisition function analyzes a call received from the telephone line for identifying the country, route, and other information of the call and transmits those line connection data to a line connection data processor (2). The line connection data processor (2) selects one of the acoustic analyzers (4) and (5) in response to the line connection data from the interface (1) and also one of the speech model storages (7) to (9). A speech pattern matcher (11) compares an acoustic vector train output of the selected acoustic analyzer with the speech models given from the selected reference speech model storage for speech recognition.

6 Claims, 3 Drawing Sheets

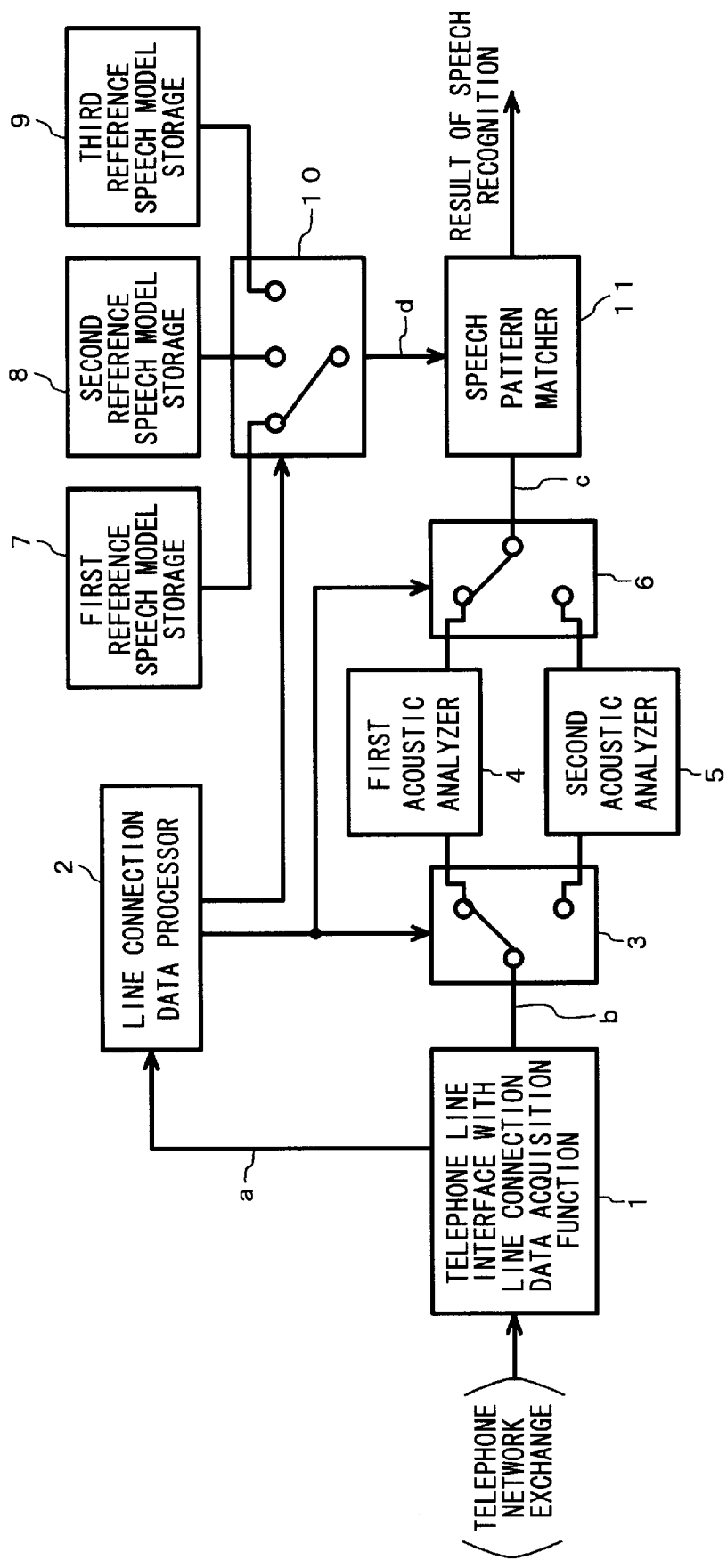
F I G. 1

TELEPHONE SPEECH RECOGNITION SYSTEM

BACKGROUND OF THE INVENTION

1. Field of the Invention

The present invention relates to a telephone speech recognition system and particularly, a telephone speech recognition system for use with a telephone line, network, or switchboard.

2. Description of the Related Art

A conventional speech recognition system connected to a telephone line is now explained referring to FIG. 3. When the speech of a caller is received from a telephone line and has to be identified, it is transmitted via a telephone line interface 31 to the speech recognition system. The conventional speech recognition system substantially comprises an acoustic analyzer 32, a speech pattern matcher 33, and a reference speech model storage 34.

The speech of the caller introduced from the telephone line interface 31 is first fed to the acoustic analyzer 32. In the acoustic analyzer 32, the speech is divided at equal intervals of substantially 10 milliseconds (ms) on the basis of a Hamming window of about 25 ms and subjected to acoustic analysis such as cepstrum analysis to produce an acoustic vector train which is then supplied to the speech pattern matcher 33. The reference speech model storage 34 saves speech models such as HMMs (hidden Markov models). The speech pattern matcher 33 collates the acoustic vector train with the speech models saved in the reference speech model storage 34. Consequently, a succession of symbols representing the speech models at highest likelihood are released as outputs of the speech recognition.

In the conventional manner, the speech recognition is however carried out regardless of the conditions of line connection from a caller at the other end of the line to the telephone line interface 31 at the entrance of the speech recognition system. More specifically, the collating action of the speech pattern matcher 33 with the speech models saved in the reference speech model storage 34 is executed without concerning any of the conditions of line connection. Accordingly, when particular noises from the telephone line are involved or there is a difference in the frequency characteristic between the conventional telephone line and a line used with a system such as a mobile telephone set, a desired level of speech recognition will hardly be accomplished.

It is particularly difficult for such a conventional speech recognition system to recognize voice data in a call received from the international telephone line which varies depending on terminal and line systems of a country.

SUMMARY OF THE INVENTION

It is an object of the present invention to provide a telephone speech recognition system capable of performing a high level of speech recognition without affecting from various conditions of a telephone line while eliminating the foregoing drawbacks of the prior art.

For achievement of the object of the present invention, a telephone speech recognition system for recognizing speech data received from a telephone line comprises a telephone line interface connected to the telephone line for detecting line connection data, a plurality of acoustic analyzers having means for removing noise derived from the line characteristics and/or the route characteristics, and a line connection data processor responsive to the line connection data from the telephone line interface for selecting the acoustic analyzers. In addition, a plurality of reference speech model storages for saving speech models corresponding to the line characteristics and/or the route characteristics may be provided.

The telephone speech recognition system according to the present invention allows the telephone line connection data to be used for selecting a desired acoustic analyzer and a pertinent speech model, thus enhancing the quality of speech recognition.

BRIEF DESCRIPTION OF THE DRAWINGS

FIG. 1 is a block diagram showing a first embodiment of the present invention;

DETAILED DESCRIPTION OF THE PREFERRED EMBODIMENTS

Figure 2:
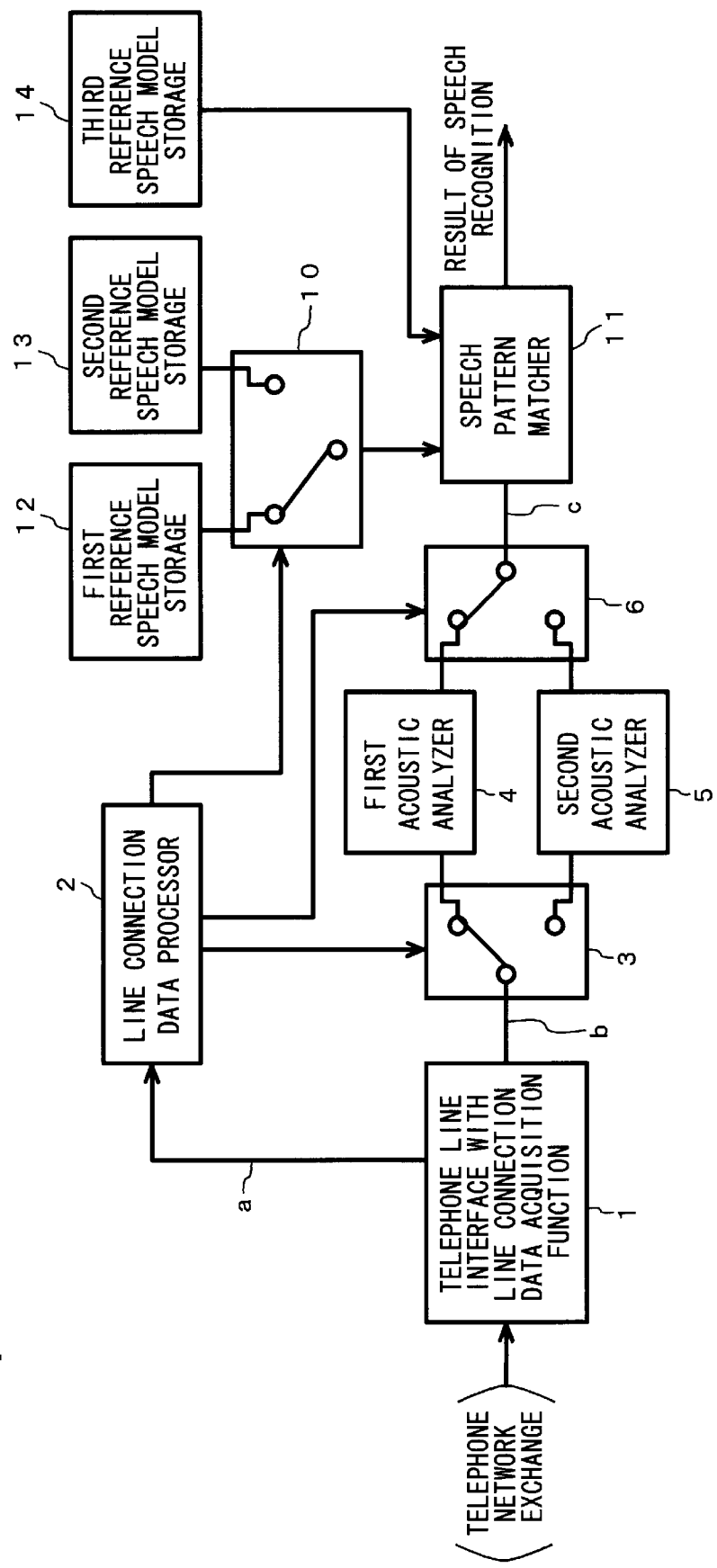
FIG. 2 is a block diagram showing a second embodiment of the present invention.

The present invention will be described in more detail referring to the accompanying drawings. FIG. 1 is a block diagram showing one embodiment of the present invention.

As shown, a line interface 1 having a known function of line connection data acquisition is connected to a telephone line, a network or a switching board. The telephone line interface 1 with the line connection data acquisition function examines line connection data of a received call including the telephone number of a caller, the interconnection in a private branch exchange (PBX), and (when the call is an international call,) the country of the caller and the route of transmission (e.g. via satellite links or underwater cable links). The line connection data a extracted by the telephone line interface 1 with line connection data acquisition function is transmitted to a line connection data processor 2 while a speech data b of the call is given to a first switching unit 3.

In response to the line connection data a from the telephone line interface 1 with line connection data acquisition function, the line connection data processor 2 actuates the first switching unit 3 and a second switching unit 6 to select either a first 4 or a second acoustic analyzer 5. Each of the first 4 and the second acoustic analyzer 5 separates the speech data at equal intervals of substantially 10 ms on the basis of a Hamming window of about 25 ms and subjects its data segments to acoustic analysis such as cepstrum analysis to produce a train of acoustic vectors.

It is now noted that the speech may be free from or contain a noise in a particular frequency range of voice signal depending on the route of transmission or the country of the caller, for example, any call from a specific nation in Europe carries such a noise. For handling the former and the latter, the first 4 and the second acoustic analyzer 5 respectively are connected in parallel for selective use.

The first acoustic analyzer 4 analyzes the speech which contains no such noise. The second acoustic analyzer 5 has a notch filter or the like for removing the noise to produce a acoustic vector train from the noise-free speech. The embodiment is not limited to the two acoustic analyzers 4 and 5 shown and three or more acoustic analyzers may be used when three or more noise-imposed speech data are received.

There are provided three, first, second, and third, reference speech model storages 7 to 9 for saving speech models, e.g. HMMs, defined according to the countries of callers and the routes of transmission. A third switching unit 10 is responsive to a control signal from the line connection data processor 2 for selectively connecting one of the three reference speech model storages 7 to 9 to the speech pattern matcher 11. The speech pattern matcher 11 then compares a speech model d from the selected reference speech model storage with the acoustic vector train c transmitted through the second switching unit 6 for speech recognition and delivers its result.

In the embodiment, the most appropriate acoustic analyzer and speech model storage can be selected corresponding to the line connection data including the country of a caller and/or the route of transmission. This allows the speech recognition to conform to the characteristics of the telephone line and the noise, hence enhancing the performance of the speech recognition system. The speech models saved in the first to third speech model storages 7 to 9 may be increased in quality through learning.

A second embodiment of the present invention will now be described referring to FIG. 2. The second embodiment is substantially identical to the first embodiment but characterized by another set of first to third reference speech model storages 12 to 14 which are then explained in more detail.

Figure 3:
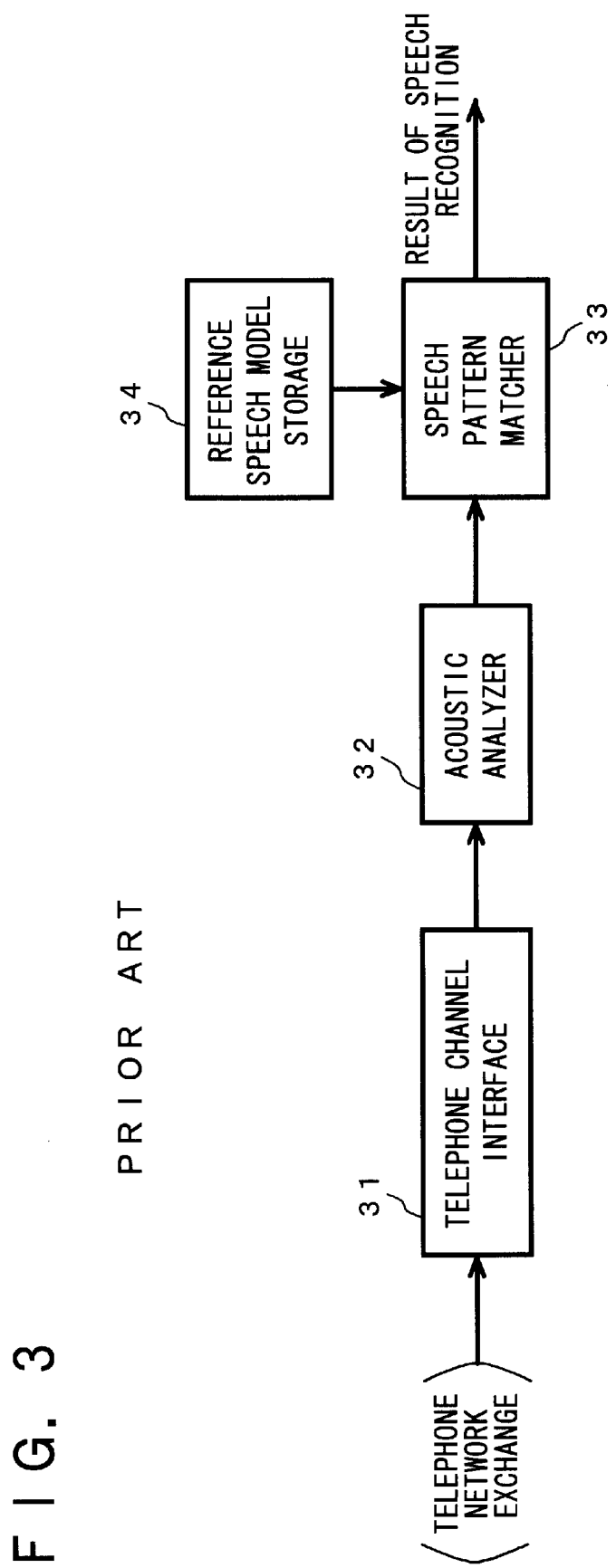
FIG. 3 is a block diagram showing a conventional speech recognition system.

In particular, the first 12 and the second speech model storage 13 save noise models. A speech may include a silence pause where no sound is made. It is essential for the speech recognition to correctly discriminate the silence pause from the other speech period. However, an intrinsic noise is sometimes imposed on the silence pause when the call travels through a particular route. For identification of such intrinsic noises, their models are saved in the first 12 and the second speech model storage 13. The switching unit 10 is activated by a control signal from the line connection data processor 2 to selectively connect either the first 12 or the second speech model storage 13 to the speech pattern matcher 11. The third speech model storage 14 saves speech models for use regardless of the country of a caller and/or the route of transmission. More specifically, the speech models saved in the third speech model storage 14 are identical to those, e.g. HMMs, saved in a speech model storage 34 shown in FIG. 3. The speech pattern matcher 11 identifies the silence pause in a speech from the noise models supplied through the third switching unit 10 and collates the speech with the speech model from the third speech model storage 14 to recognize voice sounds in the speech. A result of the speech recognition is then delivered as an output.

The first 12 and the second speech model storage 13 can improve the noise models through learning. In practice, the speech data received from a telephone line is saved in memory means and when the telephone line is disconnected, is fed to the first 4 or the second acoustic analyzer 5 for extracting its noise data which is then saved. In this manner of learning, the noise models saved in the first 12 and the second speech model storage 13 can be improved.

While the speech model storage 14 saves the speech models for use regardless of the country of a caller and/or the route of transmission in the previous embodiment and is of no limitation, a group of reference speech model storages may be provided for saving various speech models corresponding to the countries of callers and the routes so that one of them can be selected by a control signal from the line connection data processor 2.

The action of the second embodiment is explained. When a call is received from the international telephone line, the telephone line interface 1 identifies the calling country or city and/or the route of transmission from the telephone number of a caller. A resultant line connection data a is transmitted to the line connection data processor 2. Simultaneously, the telephone line interface 1 delivers a speech data b to the first switching unit 3. In response to the line connection data a received, the line connection data processor 2 sends selection control signals to the first 3, the second 6, and the third switching unit 10. For example, when the calling country or city is other than the specific ones, the first acoustic analyzer 4 and the first reference speech model storage 12 are selected by the control signals.

The speech data from the telephone line interface 1 is thus fed to its pertinent, first acoustic analyzer 4 where it is acoustically analyzed so that while silence segments in the speech data are detected by referring to the noise models saved in the first reference speech model storage 12, speech recognition is made from the speech models saved in the reference speech model storage 14.

If the call is received from the specific country or via the particular route, the second acoustic analyzer 5 and the second speech model storage 13 are selected. As the result, data of the call received from the specific country or via the particular route can be subjected to the speech recognition with the most appropriate sections of the acoustic analyzer and the speech model, whereby the quality of the speech recognition of the data will be increased.

As set forth above, the embodiment allows the acoustic analyzer and the reference speech model storage to be selected according to the country of a caller and/or the route of transmission, thus enhancing the quality of speech recognition. When a not-continuous insertion signal is contained in a call from the public booth in a specific country, it will be eliminated by selecting and using desired one of the acoustic analyzers. In a domestic use, a call from a mobile telephone is identified by its key-station number and can be subjected to the speech recognition with the use of speech models for mobile telephone, thus having a higher level of speech recognition.

The present invention allows the line connection data in a call, including the telephone number of a caller and/or the route of transmission, to be used for selecting the acoustic analyzer and the speech models. Accordingly, the speech recognition is performed in reference with the line characteristics and the noise characteristics and will be increased in the quality.

What is claimed is:

1. A telephone speech recognition system for recognizing speech data received from a telephone line comprising:

a telephone line interface connected to the telephone line for detecting line connection data having route characteristics;

a plurality of acoustic analyzers having means for removing noise derived from the telephone line route characteristics; and a line connection data processor for selecting the acoustic analyzers in response to the line connection data from the telephone line interface.

2. A telephone speech recognition system according to claim 1, further comprising:

a plurality of reference speech model storages for saving speech models corresponding to the telephone characteristics route characteristics, in which a selection signal from the line connection data processor is used for selecting the reference speech model storages.

3. A telephone speech recognition system according to claim 2, wherein the reference speech model storages save speech models corresponding to the telephone line characteristics route.

4. A telephone speech recognition system according to claim 2, wherein the reference speech model storages save noise models appearing in silence segments in dialogue attributed to the telephone line so that any silence segment in a dialogue can be recognized by a speech pattern matcher referring to the noise models.

5. A telephone speech recognition system according to claim 3, wherein the speech models saved in the reference speech model storage are updated by learning.

6. A telephone speech recognition system according to claim 4, wherein the speech models saved in the reference speech model storage are updated by learning.

* * * * *

UNITED STATES PATENT AND TRADEMARK OFFICE
CERTIFICATE OF CORRECTION

PATENT NO. : 5,960,063
DATED : September 28, 1999
INVENTOR(S) : Shingo Kuroiwa et al.

It is certified that error appears in the above-identified patent and that said Letters Patent is hereby corrected as shown below:

Column 4, line 67 to Column 5, line 1, delete "characteristic" and insert --line--.

Signed and Sealed this

Fourteenth Day of November, 2000

Attest:

Q. TODD DICKINSON

Attesting Officer

Director of Patents and Trademarks